July 9, 1968
J. C. HAMRICK
3,391,875
RETRACTABLE HOSE AND STORAGE DEVICE
Filed Nov. 9, 1966
2 Sheets-Sheet 1
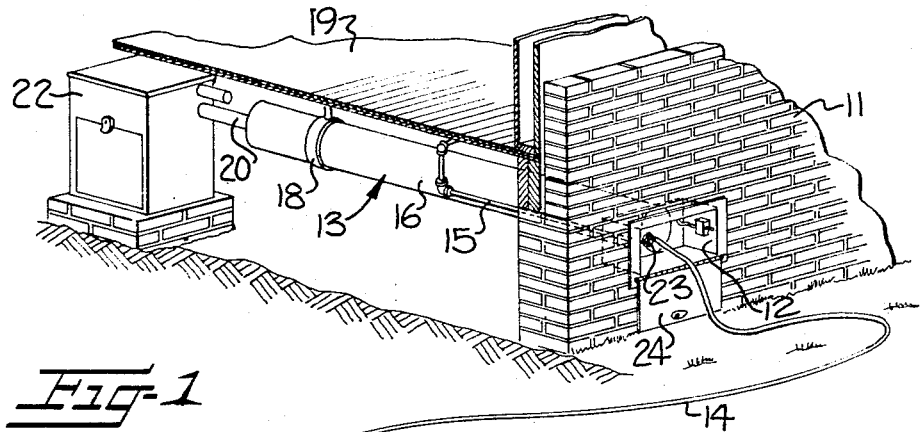
Fig-1
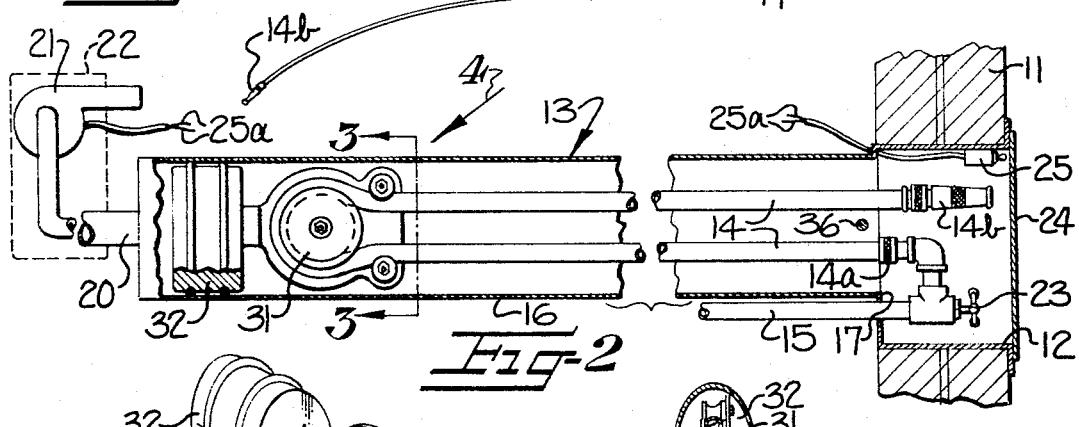
Fig-2
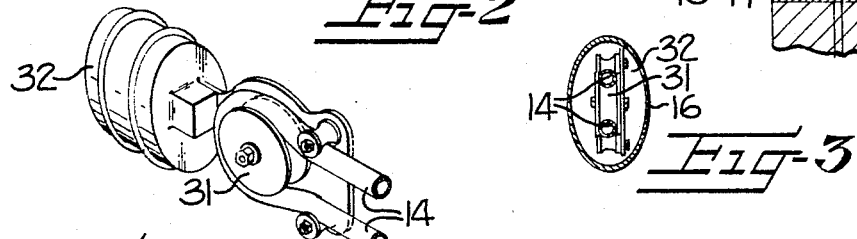
Fig-3
Fig-4
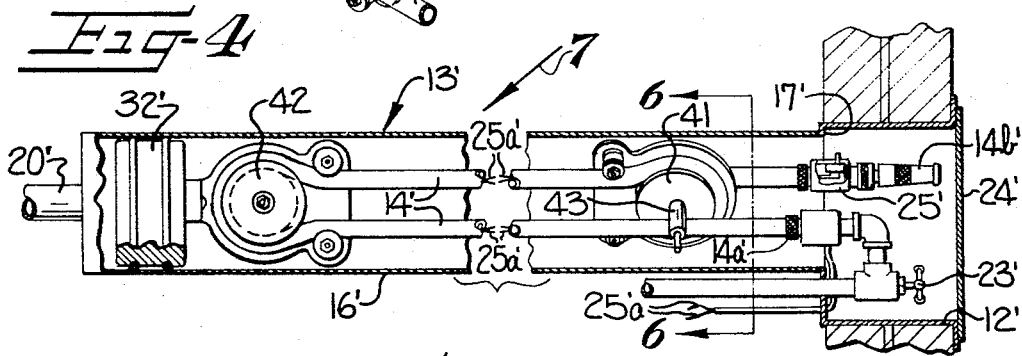
Fig-5
INVENTOR:
JAMES C. HAMRICK
BY Parrott, Bell, Seltzer, Park & Heard
ATTORNEYS

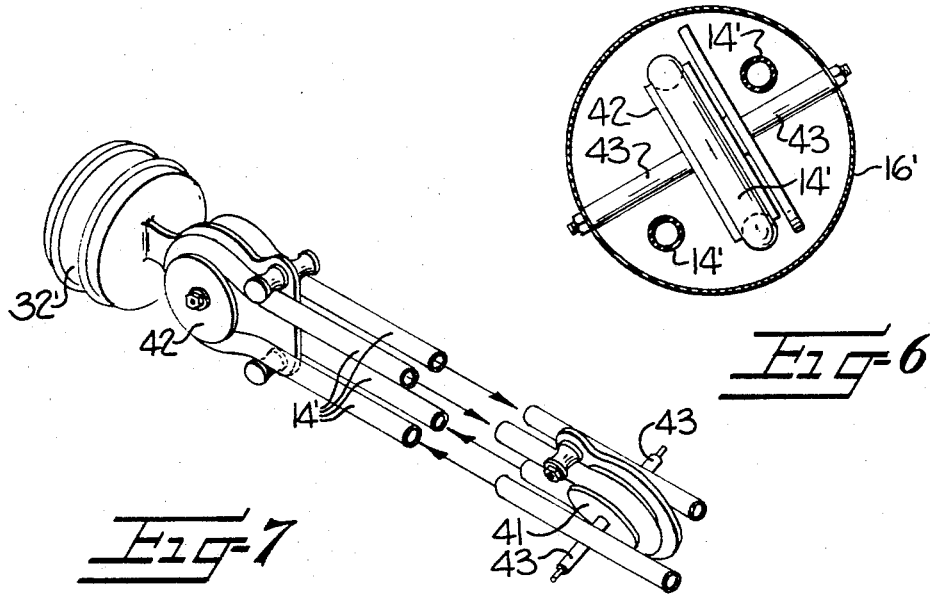
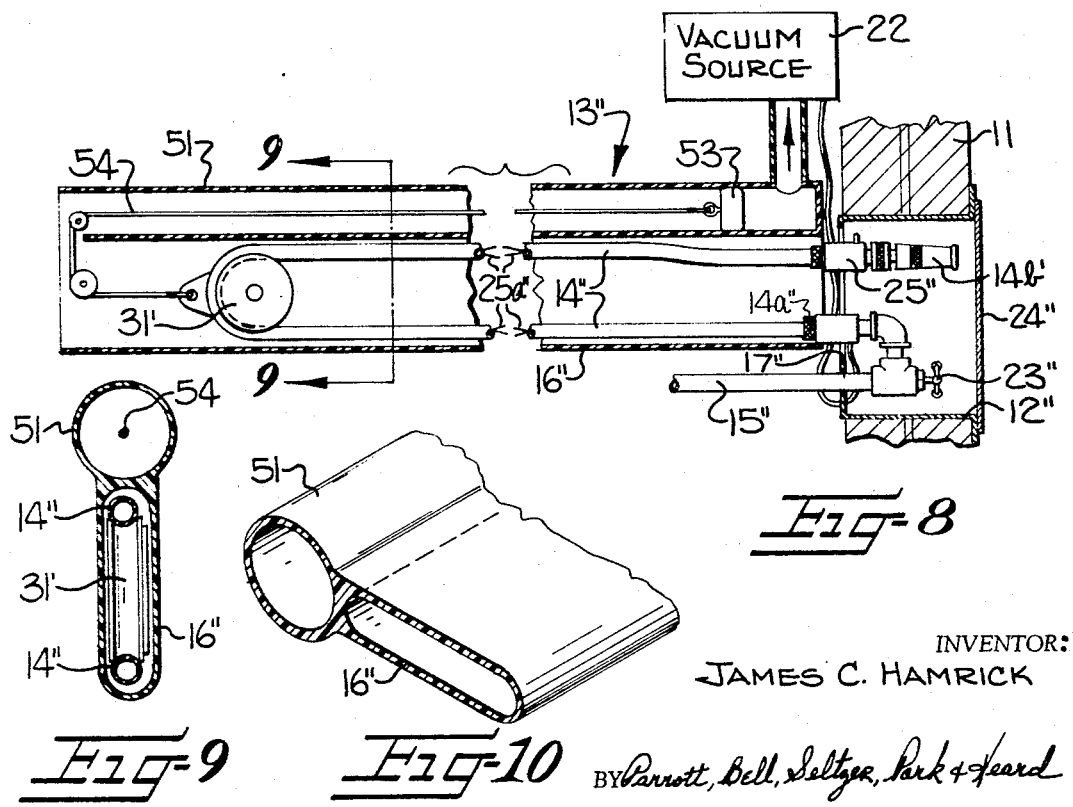

United States Patent Office 3,391,875
Patented July 9, 1968

3,391,875
RETRACTABLE HOSE AND STORAGE DEVICE
James C. Hamrick, Matthews, N.C., assignor to Jet Line Products, Inc., Matthews, N.C., a corporation of North Carolina
Filed Nov. 9, 1966, Ser. No. 593,097
7 Claims. (Cl. 242—47.5)

ABSTRACT OF THE DISCLOSURE

A retractable hose and storage device therefor wherein the hose is stored with its discharge end readily accessible for withdrawing the hose from the storage device, and wherein the hose is looped around a longitudinally movable pulley within the storage device, which pulley is carried by a fluid operated piston for effecting retraction of the hose to stored position.

---

This invention relates to fluid delivery systems and more particularly to a device for retractably storing a flexible hose at its point of use in such a system.

When use is made of a flexible hose, such as a garden hose and the like, it is desirable to provide for storage of the hose when it is not in service. When long lengths of hose are used, the hose is generally bulky, cumbersome to handle, and difficult to store. A long length of hose is also difficult to manipulate when retracting and extending the hose from its point of connection to the point to be serviced by the discharge end of the hose.

It is therefore an object of the present invention to provide a combination flexible hose and storage device wherein the hose can be retractably stored adjacent its point of attachment to a stationary supply conduit.

It is another object of the invention to provide a flexible hose and storage device wherein the hose can be retractably stored with its receiving end readily accessible for connection to a fluid supply conduit and its discharge end accessible for withdrawing the hose from the storage device.

It is another object of the invention to provide a flexible hose and storage device having means to pneumatically retract the hose longitudinally in a housing in compact, folded condition for storage.

Some of the objects of the invention having been stated, other objects will appear as the description proceeds, when taken in connection with the accompanying drawings, in which:

FIGURE 1 is a perspective view of a foundation wall and floor of a building, shown partially in cross-section, wherein a flexible hose and storage device of the present invention is installed in an opening in the foundation wall of the building;

FIGURE 2 is a fragmentary side cross-sectional view of the storage device seen in FIGURE 1 showing an elongate housing of the device with the hose fully retracted and stored therein;

FIGURE 3 is a transverse cross-sectional view of the housing taken along the line 3—3 of FIGURE 2;

FIGURE 4 is a fragmentary perspective view of the retraction means for the flexible hose looking in the direction of arrow 4 of FIGURE 2;

FIGURE 5 is a fragmentary side cross-sectional view of the flexible hose and storage device of the present invention, showing a modified form of the retraction means for the device;

FIGURE 6 is a transverse cross-sectional view of the housing taken along the line 6—6 of FIGURE 5;

FIGURE 7 is a fragmentary perspective view of the modified retraction means for the hose looking in the direction of arrow 7 of FIGURE 5;

FIGURE 8 is a fragmentary cross-sectional view of the flexible hose and storage device of the present invention showing an additional modified form of retraction means used in the device;

FIGURE 9 is a transverse cross-sectional view of the housing taken along line 9—9 of FIGURE 8; and FIGURE 10 is a fragmentary perspective view of a portion of the storage housing seen in FIGURE 9.

Referring more specifically to the drawings, in FIGURE 1 is shown a portion of a building wherein a foundation wall 11 is provided with an exterior opening 12 therein for access to a storage device 13 for retractably storing a flexible hose 14 beneath the floor of the building adjacent a water supply conduit 15.

The storage device 13 comprises an elongate housing 16 having an access opening 17 at one end which communicates with the opening 12 in the foundation wall 11. The housing is positioned horizontally and supported intermediate its length by a bracket 18 fastened to the floor 19 of the building. The interior of the housing is connected, by a conduit 20 at its inner end, to a suction device shown schematically as a centrifugal suction pump 21 housed in an enclosure 22 located beneath the floor 19 of the building.

Positioned in the opening 12 of the foundation wall is a flow control valve 23 for the water conduit 15 and the receiving end 14a of the hose is connected thereto. Also located in the opening 12 is an electrical control switch 25 which is connected by conductors 25a to cut on and off a motor (not shown) which operates the suction pump 21. A cover 24 is provided to close the wall opening 12 when the hose 14 is substantially fully retracted and stored in the elongate housing 16. As seen in FIGURE 2, the hose is normally retractably stored longitudinally in the housing 16 in a folded condition with its delivery or discharge nozzle 14b located in the opening 12 for ready access.

A pulley 31, located in the housing 16 at a point remote from the access opening 17, engages an inner loop or bight portion of the folded hose. The pulley 31 is attached to and carried by a piston 32 which sealably engages the inner wall of the housing and is free to slide longitudinally in the housing toward and away from the access opening 17 to permit withdrawal of the hose from the housing and retraction of the hose therein for storage. The inner end of the housing 16 is sealed to permit a partial vacuum to be created in the interior of the housing by the pump 21 housed in the enclosure 22 which causes movement of the piston 32 and pulley 31 toward the inner end of the housing to retract the hose into the housing.

As seen in FIGURES 3 and 4, the housing 16 and the piston 32 may be of noncircular cross-section to prevent rotation of the piston in the housing and consequent entanglement of the runs of the hose during its retraction or withdrawal.

To withdraw the hose from stored position in the housing, the cover 24 is opened and the discharge nozzle 14b of the hose is manually grasped and drawn out of the housing to an extended position, as seen in FIGURE 1. As a length of the hose 14 is drawn through the pulley 31, the pulley and piston 32 move longitudinally in the housing toward the access opening 17. A stop bar 36 is positioned transversely of the opening to prevent the withdrawal of the pulley and the piston from the housing.

To retract the hose into the housing, switch 25 is cut on to activate the suction pump 21 and create a partial vacuum in the portion of the housing 16 behind piston 32. Under influence of the partial vacuum, the piston 32 and pulley 31 move toward the inner end of the housing and draw the hose into the housing. When the piston 32 reaches the inner limit of the housing 16, the switch 25 is cut off to deactivate the suction device and the hose remains stored longitudinally in the housing in a folded condition until subsequent use.

If it is desirable to use a shorter housing or house a longer length of hose therein, the hose may be stored in a substantially circular housing 16' (FIGURE 5) in a plurality of folds with an outer loop of the folds lying adjacent the access opening 17'. In this case the outer loop is engaged by a second pulley 41 and a double roller pulley 42 is attached to the piston 32' to engage the inner loops of the hose. The second pulley 41 is secured to the walls of the housing 16' by a shaft 43 extending through the central rotational axis of the pulley (FIGURE 6). By utilizing this two-pulley block and tackle arrangement, the housing 16' can store approximately four times its length of hose.

To facilitate a free run of the reaches of the hose through the two-pulley type arrangement seen in FIGURE 5, the pulley 42 may be substantially vertically disposed on piston 32' while the pulley 41 adjacent the access opening 17' is mounted at an angle thereto (FIGURE 7), thus the reaches are free to roll over the peripheral surfaces of the pulleys to facilitate the withdrawal and retraction of the hose for storage in the housing.

Optionally, a suction device control switch 25' may be located adjacent the discharge nozzle 14b of the hose, in which case the wires 25a' leading from the switch to the suction device are embedded in the wall of the hose 14 (FIGURE 5).

If desired, an optional pneumatic retraction arrangement for the hose may be provided wherein an auxiliary piston cylinder 51 (FIGURE 8) is operatively connected to the suction device and carries a piston 53 longitudinally therein which is connected by a flexible element 54 to a movable pulley 31' adjacent the inner end of a housing 16". To prevent entanglement of the reaches of the hose, the housing 16" may be of oblong shape (FIGURES 9 and 10) and the pulley 31' effectively retained against rotation about the longitudinal axis of the housing.

In the drawings and specification there have been set forth several embodiments of the invention and, although specific terms are employed, they are used in a generic and descriptive sense only and not for purposes of limitation, the scope of the invention being defined in the claims.

What is claimed is:

1. The combination of a flexible hose and a storage device for retractably storing said hose at its point of use comprising an elongate housing having an access opening at one end thereof, said flexible hose being normally retractably stored longitudinally in said housing in folded condition with at least one loop of a fold thereof located at a point in the housing remote from said access opening, said hose having a discharge end located adjacent the access opening to readily permit withdrawal of the hose from the housing and a receiving end normally fixed at a point adjacent the access opening, means, including a pulley, slidably engaging an inner portion of said loop in the hose and being movable longitudinally in said housing toward and away from said one end to permit withdrawal of the hose from the housing and its retraction therein, and retracting means for moving said pulley toward the other end of the housing to retract the hose into the housing for storage, said retracting means including a piston sealably engaging the inner walls of said housing and carrying said pulley with the pulley being positioned between the piston and said access opening of the housing and fluid means operably connected to said piston for moving the same in said housing.

2. Apparatus as defined in claim 1 wherein said pulley is fixed against rotation about an axis substantially perpendicular to the faces of the piston and wherein said piston and said housing are shaped so as to prevent the piston from peripherally turning in said housing and entangling said hose during its withdrawal from and retraction into the housing.

3. Apparatus as defined in claim 1 wherein said elongate housing is less than one-half the length of the hose stored therein to provide a compact storage chamber for the hose.

4. Apparatus as defined in claim 1 wherein said hose has another loop of a fold located adjacent the access opening of the housing, and means slidably engaging an inner portion of said other loop for retaining the portion of the hose engaged thereby adjacent the access opening of the housing to permit storage of the hose in a multi-folded condition and to multiply the effect of said retracting means.

5. Apparatus as defined in claim 4 wherein said means for slidably engaging said other loop is a pulley rotatably mounted on a shaft carried by the walls of said housing.

6. The combination of a flexible hose and a storage device for retractably storing said hose at its point of use comprising an elongate housing having an access opening at one end thereof, said flexible hose being normally retractably stored longitudinally in said housing in folded condition with at least one loop of a fold thereof located at a point in the housing remote from said access opening, said hose having a discharge end located adjacent the access opening to readily permit withdrawal of the hose from the housing and a receiving end normally fixed at a point adjacent the access opening, a pulley slidably engaging said loop in the hose and being movable longitudinally in said housing toward and away from said one end to permit withdrawal of the hose from the housing and its retraction therein, and a fluid operated piston sealably engaging the inner walls of said housing and carrying said pulley thereon for movement in the housing.

7. Apparatus as defined in claim 6 including a suction means communicating with said housing for moving said piston and said pulley carried thereby toward the other end of the housing to retract the hose into the housing for storage.

References Cited

UNITED STATES PATENTS

| | | | |
|---|---|---|---|
| 1,557,033 | 10/1925 | Davis | 242—47.5 |
| 1,597,328 | 8/1926 | Read | 242—47.5 X |
| 1,936,463 | 11/1933 | Strang | 242—47.54 X |
| 2,118,294 | 5/1938 | Cox | 242—47.5 X |
| 2,225,859 | 12/1940 | Cox | 242—47.5 X |
| 2,241,126 | 5/1941 | Godfrey | 242—47.5 |
| 2,545,063 | 3/1951 | Wolfe | 242—47.5 X |
| 2,776,093 | 1/1957 | Cox et al. | 242—47.5 |
| 3,180,585 | 4/1965 | Pusey et al. | 242—47.5 |

FOREIGN PATENTS

| | | |
|---|---|---|
| 590,766 | 7/1947 | Great Britain. |

STANLEY N. GILREATH, *Primary Examiner.*